(12) United States Patent
Lal et al.

(10) Patent No.: US 9,080,007 B2
(45) Date of Patent: Jul. 14, 2015

(54) ANHYDRIDE ACCELERATORS FOR EPOXY RESIN SYSTEMS

(71) Applicant: Air Products and Chemicals, Inc., Allentown, PA (US)

(72) Inventors: Gauri Sankar Lal, Whitehall, PA (US); Gamini Ananda Vedage, Bethlehem, PA (US); Stephen Michael Boyce, Bath, PA (US); Pritesh G. Patel, Breinigsville, PA (US); Dilipkumar Nandlal Shah, Wescosville, PA (US); Atteye Houssein Abdourazak, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 119 days.

(21) Appl. No.: 13/779,842

(22) Filed: Feb. 28, 2013

(65) Prior Publication Data
US 2014/0243456 A1    Aug. 28, 2014

(51) Int. Cl.
C08G 59/02    (2006.01)
C08G 59/42    (2006.01)
C08G 59/68    (2006.01)

(52) U.S. Cl.
CPC ............. C08G 59/02 (2013.01); C08G 59/42 (2013.01); C08G 59/686 (2013.01)

(58) Field of Classification Search
CPC ....... C08G 59/02; C08G 59/42; C08G 59/686
USPC .............. 523/455, 456, 461; 524/96, 99, 238; 252/183.11; 528/94
See application file for complete search history.

(56) References Cited

U.S. PATENT DOCUMENTS

| | | | |
|---|---|---|---|
| 2,949,441 A | 8/1960 | Newey | |
| 3,759,954 A * | 9/1973 | Batzer et al. | 549/337 |
| 3,839,281 A | 10/1974 | Dreher | |
| 4,885,354 A | 12/1989 | Hofer et al. | |
| 4,973,648 A | 11/1990 | Hofer et al. | |
| 5,171,769 A * | 12/1992 | Bull et al. | 523/447 |
| 5,650,477 A | 7/1997 | Parodi et al. | |

FOREIGN PATENT DOCUMENTS

| | | |
|---|---|---|
| EP | 0615994 A1 | 9/1994 |
| GB | 1009806 A | 11/1965 |
| GB | 1558555 A | 1/1980 |
| JP | H08198953 A | 8/1996 |
| JP | 2005075915 A | 3/2005 |
| WO | 2009/089145 A1 | 7/2009 |

OTHER PUBLICATIONS

Three Bond Technical News; vol. 32; Dec. 20, 1990.
Smith, J.; J. Appl. Poly. Sci.; vol. 26; 1981; p. 979.
Tanaka, Y.; "Synthesis and Characteristics of Epoxides"; C.A. May, ed., Epoxy Resins Chemistry and Technology; Marcel Dekker, 1988.

\* cited by examiner

*Primary Examiner* — Kriellion Sanders
(74) *Attorney, Agent, or Firm* — Michael K. Boyer

(57) ABSTRACT

Carboxylic acid salts of tertiary amines for use as an accelerator for an anhydride based epoxy curing agents are disclosed. The disclosed carboxylic acid salts of certain tertiary amines are latent anhydride accelerators and enable epoxy resin curing when heated to an elevated temperature (e.g., an onset temperature of greater than about 50° C.).

23 Claims, No Drawings

ANHYDRIDE ACCELERATORS FOR EPOXY RESIN SYSTEMS

BACKGROUND OF THE INVENTION

The instant invention relates to liquid tertiary amine accelerators which are used to provide latency for anhydride curing agents for epoxy resins.

Certain anhydrides are known for use as curing agents for epoxy resins. The commercially known anhydrides possess the advantage of producing only mild skin irritation compared to amine curing agents and generally provide acceptable viscosity and pot life. Epoxy resins cured with anhydrides generally exhibit high temperature stability, good radiation stability as well as useful physical and electrical properties above their deflection temperature (DT).

The reaction of anhydrides with epoxy resins is dependent upon a number of factors including, for example, the gel time and temperature, post-cure and post cure temperature, presence or absence of accelerators, type of accelerator, amount of hydroxyl group in the resin, ratio of anhydride to epoxy and the amount of free acid in the system. Anhydrides will typically not react with epoxy groups in the absence of an accelerator.

Typical commercial epoxy-resin/anhydride formulations use anhydride accelerators. These are acidic or basic compounds. Acids favor etherification while bases favor esterification. The optimum anhydride/epoxy ratio (A/E) and the cured properties of the resin are determined by the accelerator used. Tertiary amines are conventionally used as anhydride accelerators. These conventional amines are described in *Three Bond Technical News* vol. 32, Dec. 20, 1990. Conventional amines include benzlydimethylamine (BDMA) and tris(dimethylaminomethyl)phenol, triethylene diamine (TEDA), N,N-dimethylpiperazine and 2-(dimethylaminomethyl)phenol. Imidazoles such as 2-methylimidazole, 2-Et-4-methylimidazole,1-cyanoethyl-2-undecylimidazolium trimellitate and the epoxy-imidazole adduct (2-methylimidazole/Epon 828).

U.S. Pat. No. 3,839,281 discloses using N-hydroxyethyl piperidines and piperazyl compounds as accelerators for epoxy resins systems cured with anhydrides and dicyandiamide (DICY). U.S. Pat. No. 5,650,477 discloses quaternary ammonium salts bearing an ether linkage with a nitrile group were used as catalysts for anhydride cured expoxy resins under microwave irradiation. Solid metal acetylacetonates are described as latent curing agents in J. Appl. Poly. Sci, 26, 1981, 979 by J. Smith. These solid metal acetylacetonates have the disadvantage of not being able to be dispersed adequately to effect efficient curing of epoxy resins by anhydrides.

The previously disclosed patents, patent applications and documents are hereby incorporated by reference.

There is a need in this art for anhydride accelerators with improved latency in order to minimize the waste of the pre-mixed anhydride system thereby providing a significant saving in raw material cost as well as cured epoxy systems having desirable physical properties.

BRIEF SUMMARY OF THE INVENTION

The instant invention solves problems associated with conventional anhydride accelerators by providing tertiary amine salts. The inventive tertiary amine salt accelerators function as latent curing agents and enable prolonged storage stability in an admixture with anhydride curing agents and epoxy resins at ambient temperature as well as rapid curing when heated to an elevated cure temperatures. In addition the inventive tertiary amine salts can reduce cycle time and thereby provide increased throughput when producing cured epoxy resin components.

Epoxy-resin cured with anhydrides and tertiary amine salts of the invention can be used in a wide range of applications including electrical insulating materials, molded articles, fiber reinforced composites, among other uses.

One aspect of the invention comprises a composition comprising at least one tertiary amine salt and at least one anhydride.

Another aspect of the invention comprises at least one tertiary amine salt, at least one anhydride and at least one epoxy resin.

A further aspect of the invention comprises a composite wherein a composition comprising at least one tertiary amine salt, at least one anhydride and at least one epoxy resin embeds at least one filler material such as fiberglass.

Another aspect of the invention comprises a composition comprising at least one tertiary amine salt, at least one anhydride, at least one epoxy resin wherein the composition has an onset temperature ranging from about 100 to about 150 C; an H of about 150 to about 400 J/g, and a Tg ranging from about 60 to about 175.

The various aspects of the invention can be used alone or in combination.

DETAILED DESCRIPTION OF THE INVENTION

The instant invention relates to carboxylic acid salts of tertiary amines for use as an accelerator for an anhydride based epoxy curing agents. The inventive carboxylic acid salts of certain tertiary amines are latent anhydride accelerators and enable epoxy resin curing when heated to an elevated temperature (e.g., an onset temperature of greater than about 50° C.). The inventive amine salts can be used to obtain an epoxy curing agent having an onset temperature ranging from about 100 to about 150 C, about 128 to about 145 and in some cases about 138 to about 143. The inventive amine salts impart an H>120 J/g (e.g., about 150 to about 400 J/g, about 150 to about 260 and in some cases about 200 to about 250). The inventive amine salts can be combined with an anhydride in order obtain an epoxy resin system having a Tg ranging from about 60 to about 175, about 70 to about 150 and in some cases about 80 to about 125.

In one aspect of the invention, the inventive anhydride accelerator is represented by the structure of Structure 1:

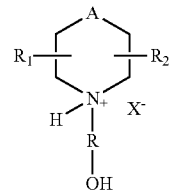

Structure 1

Compounds of Structure 1 may contain at least one and at most four substituents on the ring carbon atoms wherein A, O, NH, NR, R is an alkylene chain of 1-6 carbon atoms preferably 1-3 carbon atoms and the hydroxyl group may be attached to any of the carbon atoms but preferably on the end carbon atom. $R_1$, $R_2$ may be H, or alkyl (1-20 carbon atoms) preferably lower alkyl of 1-7 carbon atoms, haloalkyl (1-20 carbon atoms), aryl, hydroxyl alkyl (1-7 carbon atoms). $X^-$ is a carboxylate anion of 1-40 carbon atoms. Examples of compounds represented by Structure 1 comprise at least one member selected from the group consisting of a N-hydroxyalkylpiperidinyl (A=CH$_2$), N-hydroxyalkylmorpholinyl (A=O), a N-hydroxypiperazinyl (A=NR$^+$X$^-$) compound, a-1-hydroxyethylpiperazinyl (A=NH), and combinations thereof.

Representative tertiary amines that can be used to form the salt of Structure 1 comprise at least one member selected from the group consisting of N-hydroxyethylpiperidine, N-hydroxypropylpiperidine, 2-methyl-N-hydroxyethylpiperidine, N-hydroxymethylpiperidine, N-hydroxyethylmorpholine, 1,4-bis(2-hydroxyethyl)piperazine, and 1,4-dimethylpiperazine. Representative carboxylic acids that can be used to form salts of the tertiary amines comprise at least one member selected from the group consisting of acetic acid, propanoic acid, hexanoic acid, 2-ethylhexanoic acid, decanoic acid, tall oil fatty acid (TOFA), dimer acid and mixtures thereof.

Tertiary amine salts of the invention can be formed by contacting at least one suitable amine with at least one carboxylic acid (e.g., tertiary amine salts of the amines represented with dicarboxylic and tricarboxylic acids). When using a dicarboxylic acid to form the inventive salt, the salt is formed from two mole equivalent of the amine with one mole equivalent of the acid while with tricarboxylic acid the salt is formed from three mole equivalent of the amine with one equivalent of the acid.

While any suitable method can be used for contacting at least one tertiary amine with at least one carboxylic acid, an exemplary method comprises contacting N-hydroxyethylpiperidine with tall oil fatty acid. The molar ratio of tertiary amine to carboxylic acid can range from about 1.0 to about 1.05, about 0.95 to about 1.05 and in some cases about 1.0 to about 1.1.

In another aspect of the invention, the inventive tertiary amine salts of carboxylic acids are represented by the structure of Structure 2:

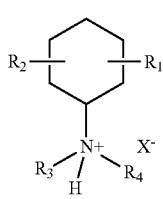

Structure 2

Wherein R$_1$, R$_2$ may be H, or alkyl (1-20 carbon atoms) preferably lower alkyl of 1-7 carbon atoms, haloalkyl (1-20 carbon atoms), aryl, hydroxyl alkyl (1-7 carbon atoms). R$_3$, R$_4$ may alkyl (1-20 carbon atoms) preferably lower alkyl of 1-7 carbon atoms, X$^-$ is a carboxylate anion of 1-40 carbon atoms. Examples of compounds represented by Structure 2 comprise at least one member selected from the group consisting of the salt of N-cyclohexyl-N,N-dimethylamine with the acids acetic acid, hexanoic acid and tall oil fatty acid.

Representative amines that can be used to form the salt illustrated by Structure 2 comprise at least one member selected from the group consisting of N-cyclohexyl-N,N-dimethylamine, N-cyclohexyl-N,N-diethylamine, N-cyclohexyl-N-ethyl-N-methylamine, N,N-dimethyl-N-(2-methylcyclohexyl)amine and N,N-dicyclohexyl-N-methylamine, N-hydroxyethyl-N-cyclohexyl-N-methylamine, N-cyclohexyl-N,N-dipropylamine, N-cyclohexyl-N,N-dioctylamine and combinations thereof. Representative carboxylic acids that can be used to form salts of the tertiary amines of Structure 1 comprise at least one member selected from the group consisting of acetic acid, propanoic acid, hexanoic acid, 2-ethylhexanoic acid, decanoic acid, tall oil fatty acid (TOFA), dimer acid and mixtures thereof.

Tertiary amine salts of the invention can be formed by contacting at least one suitable amine with at least one carboxylic acid (e.g., tertiary amine salts of the amines represented with dicarboxylic and tricarboxylic acids). When using a dicarboxylic acid to form the inventive salt, the salt is formed from two mole equivalent of the amine with one mole equivalent of the acid while with tricarboxylic acid the salt is formed from three mole equivalent of the amine with one equivalent of the acid.

While any suitable method can be used for contacting at least one tertiary amine with at least one carboxylic acid, an exemplary method comprises contacting N-cyclohexyl N,N-dimethylamine with tall oil fatty acid. The ratio of tertiary amine to carboxylic acid can range from about 1.0 to about 1.05, about 0.95 to about 1.05 and in some cases about 1.0 to about 1.1.

The inventive amine salts are combined with suitable anhydrides in order to obtain an epoxy curing agent. The amine salts and anhydrides can be combined by any suitable method such as mixing, pumping one into the other, vacuum transferring one into the other and under ambient or pressure conditions (e.g., a pressure of about 0.1 Torr to about 10 Torr. Examples of suitable anhydrides comprise at least one linear polymeric anhydrides such as polysebacic and polyazelaic anhydride; alicyclic anhydrides such as methyltetrahydrophthalic anhydride, tetrahydro phthalic anhydride, methyl nadic anhydride, hexahydro phthalicanhydride, and methylhexahydro phthalic anhydride; simple alicylic anhydrides such as succinic anhydride, substituted succinic anhydride, citric acid anhydride, maleic anhydride and special adducts of maleic anhydride, dodecyl succinic anhydride, maleic anhydride vinyl and styrene copolymers of maleic anhydride, multi-ring alicyclic anhydrides and aromatic anhydride such as phthalic anhydride and trimellitic anhydride. The accelerator may combined with anhydride in a ratio of about 1 about 40 parts per hundred parts of curing agent, about 1 to about 20 parts; and in some cases about 1 to about 10 parts. The epoxy curing compositions of this invention may contain from about 0.8 to about 1.1 equivalents of anhydride curing agents per equivalent of epoxy, about 1.0 to about 1.0 and in some cases about 0.95 to about 1.05 equivalents.

While if desired the inventive epoxy curing agent can be employed along with tertiary amines, in one aspect of the invention, the inventive epoxy curing agent can avoid problems associated with tertiary amines by being substantially free of tertiary amines. By "substantially free of tertiary amines" it is meant that the curing agent comprises less than about 5 wt %, less than 2 wt % and in some cases 0 wt % tertiary amines.

In another aspect of the invention, the epoxy curing agent is substantially free of water. By "substantially free of water" it is meant that the curing agent comprises less than about 5 wt %, less than 2 wt % and in some cases 0 wt % water.

In a further aspect of the invention, the epoxy curing agent may comprise at least one additive selected from the group consisting of glass beads, talc, calcium carbonate, carbon black, silica beads, clay, fibers, mica. The amount of such additives can range from about 0.1% to about 60 wt %, about 10% to about 50% and in some cases from about 20% to about 40%.

The inventive curing agent can be used for curing an epoxy resin. By "curing" it is meant a reaction of the anhydride with the epoxy resin to produce a polymeric composition consisting of polyether groups and polyester groups. Examples of epoxy resins that be cured with the inventive curing agent comprise at least one of the following: Epoxy resins commercially available under the trade name DER 383 (available from Dow) and EPON 826 (available from Hexion Specialty Chemicals) are suitable for this application. Other epoxy resins may include, but are not limited to, bi-functional epoxies, such as, bisphenol-A and bisphenol-F resins. Multi-functional epoxy resin, as utilized herein, describes compounds containing two or more 1,2-epoxy groups per molecule. Epoxide compounds of this type are well known to those of skilled in the art and are described in Y. Tanaka, "Synthesis and Characteristics of Epoxides", in C. A. May, ed., Epoxy Resins Chemistry and Technology (Marcel Dekker, 1988), which is incorporated herein by reference.

One class of epoxy resins suitable for use in the instant invention comprises the glycidyl ethers of polyhydric phenols, including the glycidyl ethers of dihydric phenols. Illustrative examples include, but are not limited to, the glycidyl ethers of resorcinol, hydroquinone, bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis-(4-hydroxy-3,5-dichlorophenyl) propane, 2,2-bis-(4-hydroxyphenyl)-propane (commercially known as bisphenol A), bis-(4-hydroxyphenyl)-methane (commercially known as bisphenol-F, and which may contain varying amounts of 2-hydroxyphenyl isomers), and the like, or any combination thereof. Additionally, advanced dihydric phenols of the following structure also are useful in the present disclosure:

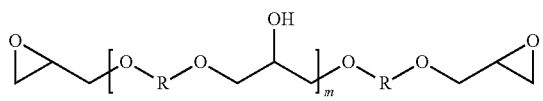

where m is an integer, and R is a divalent hydrocarbon radical of a dihydric phenol, such as those dihydric phenols listed above. Materials according to this formula can be prepared by polymerizing mixtures of a dihydric phenol and epichlorohydrin, or by advancing a mixture of a diglycidyl ether of the dihydric phenol and the dihydric phenol. While in any given molecule the value of m is an integer, the materials are invariably mixtures which can be characterized by an average value of m which is not necessarily a whole number. Polymeric materials with an average value of m between 0 and about 7 can be used in one aspect of the present disclosure. In other embodiments, the epoxy component may be a polyglycidyl amine from one or more of 2,2'-methylene dianiline, m-xylene dianiline, hydantoin, and isocyanate.

The epoxy component may be a cycloaliphatic (alicyclic) epoxide. Examples of suitable cycloaliphatic epoxides include diepoxides of cycloaliphatic esters of dicarboxylic acids such as bis(3,4-epoxycyclohexylmethyl)oxalate, bis(3,4-epoxycyclohexylmethyl)adipate, bis(3,4-epoxy-6-methyl-cyclohexylmethyl)adipate, vinylcyclohexene diepoxides; limonene diepoxide; bis(3,4-epoxycyclohexylmethyl)pimelate; dicyclopentadiene diepoxide; and other suitable cycloaliphatic epoxides. Other suitable diepoxides of cycloaliphatic esters of dicarboxylic acids are described, for example, in WO 2009/089145 A1, which is hereby incorporated by reference.

Other cycloaliphatic epoxides include 3,3-epoxycyclohexylmethyl-3,4-epoxycyclohexane carboxylate such as 3,4-epoxycyclohexylmethyl-3,4-epoxycyclohexane carboxylate; 3,3-epoxy-1-methylcyclohexyl-methyl-3,4-epoxy-1-methylcyclohexane carboxylate; 6-methyl-3,4-epoxycyclohexylmethylmethyl-6-methyl-3,4-epoxycyclohexane carboxylate; 3,4-epoxy-2-methylcyclohexyl-methyl-3,4-epoxy-3-methylcyclohexane carboxylate. Other suitable 3,4-epoxycyclohexylmentyl-3,4-epoxycyclohexane carboxylates are described, for example, in U.S. Pat. No. 2,890,194, which is hereby incorporated by reference. In other embodiments, the epoxy component may include polyol polyglycidyl ether from polyethylene glycol, polypropylene glycol or polytetrahydrofuran or combinations thereof.

The inventive curing agent can be combined with epoxy resin by any suitable method. Examples of suitable methods comprise pumping, vacuum transferring, pressure transferring and using approximately 14 psi conditions. Once combined with curing agent, the epoxy resin system can be cured by heating to the previously identified onset temperatures. When an epoxy resin comprising a bis(phenol) A diglycidyl ether is cured, the cured resin can have desirable mechanical properties. For example, a tensile strength as defined by ASTM D638 of about 1000 psi to about 14,000 psi, and about 7,000 psi to about 12,000 psi; a flexural strength as determined by ASTM D790 of about 5,000 psi to about 18,000 psi, and about 8,000 psi to about 15,000 psi; a flexural modulus of about 250,000 psi to about 400,000 psi, and about 300,000 psi to about 355,000 psi; and a compressive strength as measured by ASTM D695 of about 8,000 psi to about 16,000 psi, and about 10,000 psi to about 14,000 psi.

The inventive curing agent can be combined with an epoxy resin in order to obtain a composite material. The epoxy resin can comprise a matrix material that embeds a filler comprising at least one of fiberglass, E or S-glass, among other filler materials. When a matrix comprising an epoxy embeds a fiberglass, the cured composite can have desirable mechanical properties. For example, flexural strength as determined by ASTM D790 of about 80,000 psi to about 200,000 psi, and about 100,000 psi to about 175,000 psi and in some cases about 130,000 psi to about 150,000 psi; a flexural modulus of about $5.5 \times 10^5$ psi to about $7.0 \times 10^5$-psi and about $6.0 \times 10^5$-psi to about $6.5 \times 10^5$-psi and in some cases about $6.2 \times 10^5$-psi to about $6.3 \times 10^5$-psi; and an Inter Laminar Shear Strength (ILSS) of about 5,000 psi to about 15,000 psi and about 7,000 psi to about 13,000 psi and in some cases about 9,000 psi to about 10,500 psi.

The following Examples are provided to illustrate certain aspects of the invention and do not limit the scope of the appended claims. Table 1 below illustrates the thermal behavior of an inventive composition comprising a combination of an amine salt accelerator, anhydride and epoxy resins. In particular, Table 1 illustrates:

(a) The amine salts shown by Structures 1 and 2 function as active accelerators for anhydrides in epoxy systems with H>120 J/g; and, (b) The carboxylic acid used to prepare the inventive amine salts are generally inactive as anhydride accelerators as indicated by the negligible heat of reaction when used for curing the anhydride system.

Table 2 below compares the latency of the inventive tertiary amine salts with tertiary amines. In particular, Table 2 illustrates:

(a) The inventive amine salts were at least twice as latent as the conventional tertiary amine curing agents benzyl dimethyl amine and tris(dimethylaminomethyl)phenol;

(b) The inventive amine salts were at least twice as latent as precursor tertiary amines (N-Hydroxyethylpiperidine, 4-(2-Hydroxyethyl)morpholine), Cyclohexyl dimethyl amine) that were used to form the inventive amine salts; and, (c) The inventive amine salts were at least twice as latent as the corresponding salts of tall oil fatty acid salt of benzyl dimethyl amine.

EXAMPLES

Example 1

General Procedure for Preparation of Amine Salts

The tertiary amine (1 mole) was charged into a 3-neck round bottom flask equipped with a overhead mechanical stirrer and nitrogen inlet and thermocouple. The acid (1 mole) was added slowly to maintain the temperature at 25-30° C. On completion the mixture was cooled to room temperature and used for DSC and latency studies.

Example 2

Differential Scanning Calorimetric (DSC) Study of Anhydride Accelerators

The amine salt (2 g) prepared above was mixed with dodecyl succinic anhydride (54 g) methyl tetrahydrophthalic anhydride (54 g) and bisphenol A diglycidyl ether resin (100 g) using a stainless steel spatula until a uniform mixture was obtained. A sample of this mixture was analyzed by using a commercially available DSC (TA Instruments QA20) having a soft ware program embedded in the DSC that starts at 25° C. and heats at 10° C./minute up to 300° C., cools and scans a second time to 250° C. The first scan provides cure data including onset temperature, peak exotherm and heat of reaction, while the second scan confirms the glass transition temperature.

Example 3

Latency Study of Anhydride Accelerators

The salts prepared in example 1 were analyzed for latency. Pot life of each system was measured by Brookfield viscometer (model no RVDV-II+P with spindle number 27) which was connected to a laptop computer using the Brookfield Wingather program. The viscosity versus time and temperature were recorded.

TABLE 1

DSC of anhydride accelerators

| Anhydride accelerator | Onset temperature (° C.) | ΔH (Joules/g) | $T_g$ (° C.) |
|---|---|---|---|
| N-Hydroxyethylpiperidine salt with 2-ethyl hexanoic acid | 137.8 | 216.7 | 74.85 |
| N-Hydroxyethylpiperidine salt with tall oil fatty acid | 139.8 | 190.6 | 67.89 |
| 4-(2-Hydroxyethyl)morpholine salt with 2-ethyl hexanoic acid | 140.38 | 151.7 | 47.84 |
| 4-(2-Hydroxyethyl)morpholine salt with tall oil fatty acid | 143.29 | 122.7 | 28.76 |
| Cyclohexyl dimethyl amine salt with 2-ethyl hexanoic acid | 128.28 | 250.1 | 80.07 |
| Cyclohexyl dimethyl amine salt with tall oil fatty acid | 130.93 | 234.1 | 64.21 |
| Tris(dimethylaminomethyl)phenol | 114.63 | 254.9 | 82.07 |
| Benzyl dimethyl amine | 113.52 | 257.1 | 86.98 |
| N-Hydroxyethylpiperidine | 131.29 | 259.8 | 93.39 |
| 4-(2-Hydroxyethyl)morpholine) | 125.62 | 168.3 | 50.32 |
| Cyclohexyl dimethyl amine | 127.83 | | |
| Tall oil fatty acid salt of Benzyl dimethyl amine | 125.62 | 168.3 | 50.32 |
| Tall oil fatty acid | 150.59 | 1.6 | none |
| 2-Ethylhexanoic acid | 147.53 | 3.9 | none |

TABLE 2

Latency of anhydride accelerators

| Anhydride accelerator | Latency (time for viscosity to double at 25° C.) |
|---|---|
| N-Hydroxyethylpiperidine salt with 2-ethyl hexanoic acid | 2 days |
| N-Hydroxyethylpiperidine salt with tall oil fatty acid | 2 days |
| 4-(2-Hydroxyethyl)morpholine salt with 2-ethyl hexanoic acid | 2 days |
| 4-(2-Hydroxyethyl)morpholine salt with tall oil fatty acid | 2 days |
| Cyclohexyl dimethyl amine salt with 2-ethyl hexanoic acid | 2 days |
| Cyclohexyl dimethyl amine salt with tall oil fatty acid | 2 days |
| Tris(dimethylaminomethyl)phenol | <1 day |
| Benzyl dimethyl amine | <1 day |
| N-Hydroxyethylpiperidine | <1 day |
| 4-(2-Hydroxyethyl)morpholine) | <1 day |
| Cyclohexyl dimethyl amine | <1 day |
| Tall oil fatty acid salt of Benzyl dimethyl amine | <1 day |
| Tall oil fatty acid | <1 day |
| 2-Ethylhexanoic acid | |

Example 4

Preparation of Epoxy Curing Agent Compositions

The blend of DDSA (Dodecenyl succinic anhydride) and MTHPA (Methyltetrahydrophthalic anhydride) was prepared in a 80:20 ratio by mixing in a 500 ml beaker at 50 C. The blend was then used to make Formulations #1-5. These accelerators are liquid at temperatures of about 10° C. to about 300° C. and were blended by mixing in a 500 ml beaker at 50° C. with the anhydride mixture to achieve the liquid curing component.

TABLE 3

| Formulation | Accelerator Trade Name | Accelerator Chemical name | Accelerator compatibility with anhydride |
|---|---|---|---|
| 1 | Ancamine 1110 | Dimethylaminomethylphenol | Yes |
| 2 | Experimental | Polycat-8:TOFA | Yes |
| 3 | Experimental | NHEP-TOFA | Yes |
| 4 | Experimental | Morpholine:2EHA | Yes |
| 5 | Experimental | NHEAP:Aceticacid | Yes |

In Table 3, DDSA (Dodecenyl succinic anhydride) and MTHPA (Methyltetrahydrophthalic anhydride) were used as an anhydride mixture and mixed with various accelerators which were added to determine their solubility. It is desirable to use formulated curing agents in a liquid form for structural composite applications to avoid the filtration of an accelerator during processing. The solubility of all liquid accelerators was very good in anhydride that means liquid accelerators will have good compatibility with amines.

Example 5

Several anhydride curing agent formulations were prepared. DDSA (Dodecenyl succinic anhydride) and MTHPA (Methyltetrahydrophthalic anhydride) were used as the main curing agent and Ancamine 1110 (Dimethylaminomethylphenol) were utilized as an accelerator curing agent. Both products were mixed in the amount shown in Table 3. To facilitate mixing, both the anhydride mixture and the Ancamine 1110 were preheated separately at 55° C. for 1 hour. Formulations 1-5 re were mixed with magnetic stirrer at 1000 rpm at 55° C. for 1 hour. Resulting formulations were used to cure epoxy resin (epoxy equivalent weight (EEW) 190) at varied phr (part per hundred part of resin).

Formulations 1-5 are comparative examples wherein Formulation 1 is liquid epoxy resin (LER) (EEW 190) with anhydride and Ancamine®1110 is a registered trademark of Air Products & Chemicals and Formulations 2 and 5 are experimental accelerators. Epoxy resin used for this work is EPON® 828 (Momentive Specialty Chemicals, Inc.).

The epoxy component and anhydride curatives described above were hand mixed at 55° C. for 3-5 minutes. Entrapped air was removed by placing the mixture in a centrifuge for 5 minutes or until the mixture was cleared. The mixture was then poured into a ⅛" aluminum mold. The system in the mold was cured at 150° C. for 6 hours. Molds were allowed to cool to room temperature before removing the cured sample. Specimens were prepared from the cast samples according to ASTM methods to perform the mechanical testing; tensile test (ASTM D638), flexural test (ASTM D790), compressive (ASTM D695) and DMA (Dynamic Mechanical Analyzer).

The reactivity of all formulations shown in Example 5 was measured at 55° C. using Brookfield viscometer RV with spindle number 27. 12 grams of epoxy resin composition were used to measure the reactivity.

TABLE 4

| Epoxy anhydride formulation | | | | | |
|---|---|---|---|---|---|
| Formulation | 1 | 2 | 3 | 4 | 5 |
| Epon ® 828 (LER - EEW –190) gms | 100 | 100 | 100 | 100 | 100 |
| DDSA | 80 | 80 | 80 | 80 | 80 |
| MTHPA | 20 | 20 | 20 | 20 | 20 |
| Anhydride mixture used (gms) | 126 | 126 | 126 | 126 | 126 |
| Ancamine 1110 (phr) | 4 | — | — | — | — |
| Polycat-8:TOFA phr | — | 4 | — | — | — |
| NHEP-TOFA phr | — | — | 4 | — | — |
| Morpholine:2EHA phr | — | — | — | 4 | — |
| NHEP:Acetic acid phr | — | — | — | — | 4 |
| Tg C. (ISO) –150 C. for 6 hrs | 93 | 95 | 94 | 92 | 90 |
| Time to double initial mix vis cps @ 55 C. | 44 | 424 | 367 | 355 | 372 |
| Mix vis @25 C. with EEW180 | 135 | 110 | 122 | 131 | 116 |
| Mechanical Properties | | | | | |
| Tensile Strength (psi) | 8,749 | 9,212 | 9,064 | 9,346 | 9,065 |
| Tensile Modulus (psi) | 468,917 | 392,610 | 424,889 | 436,058 | 437,537 |
| % Elongation | 5.3 | 4.5 | 6.6 | 6.1 | 6.0 |
| Flexural Strength (psi) | 15,194 | 15,228 | 14,692 | 14,605 | 14,595 |
| Flexural Modulus(psi) | 346,000 | 362,620 | 336,881 | 342,026 | 346,020 |
| Comp Strength (psi) | 10,582 | 10,943 | 10,325 | 10,722 | 10,401 |
| Comp Modulus (psi) | 263,503 | 271,660 | 265,779 | 306,257 | 255,685 |

Example 6

Fiberglass Composite Formation

The Formulations shown in Example 4 were hand mixed in a 500 ml beaker at 55° C. for 3-5 minutes. Entrapped air was removed by placing the mixture in a centrifuge for 5 minutes or until the mixture was cleared. The mold inlet tube was placed into the mixture. The PVC ball valve was gently opened to let mixture flow through the tube to infuse through fiberglass plies (Fiberglast) that were layered within a closed aluminum mold. Fibers are infused with resin until most of the pre-weighed mixture is consumed from the beaker. Excess resin was collected in a catch pot. Integrated rod heaters allow the mold to be pre-warmed during infusion (40-60° C.) that allows uniform flow of resin in the mold for better fiber wetting. The mold was heated to higher temperatures at 125° C. for 6 hours) for post-curing. After finishing the cure schedule, the mold was cooled down to room temperature to remove the composite panel. Flexural specimens size used were 1"×⅛"×3" (W×D×L) and Inter Laminar Shear Strength (ILSS) specimens size used were ¼"×⅛"×¾".

TABLE 5

Fabrication method: Vacuum Assisted Resin Transfer Molding (VARTM)

| Mechanical Properties | Mechanical Properties unidirectional composites Formulation | | | | |
|---|---|---|---|---|---|
| | 1 | 2 | 3 | 4 | 5 |
| Flexural Strength (psi) | 159,543 | 151,209 | 145,316 | 137,609 | 152,443 |
| Flexural Modulus(psi) | 6,595,000 | 6,558,000 | 6,451,000 | 6,310,000 | 6,202.345 |
| ILSS (psi) 0 hrs | 7,075 | 6,952 | 7,260 | 6,024 | |

Fiber type: E-glass (275 g/m²) unidirectional
Fiber volume: 60 ± 3%
Cure schedule: 6 hrs @ 125° C.

Example 7

The fiberglass composite panels fabricated as described in above example were used to perform SBS (Short Beam Shear) testing in accordance with ASTM D2344 by using a Instron Model 5500 to understand the ILSS retention on composite panels after hot water exposure. The SBS specimens size used were ¼"×⅛"×¾". Seven specimens from each formulation were immersed in glass veils. All veils were filled with water. The veil covers were drilled from the top ~1/16" in diameter to avoid pressure building during testing. All veils were placed in a hot oven at temperature ~90° C. The water level in each veil was monitored every week. Fresh water was added to the veils if water level falls down due to the evaporation. After 1000 hrs of test SBS specimens were removed from the veils and dried for ½ hr at 100° C. Samples were then brought to room temperature before performing testing.

TABLE 6

| Formulation | Cure | ILSS Control (0 hrs) | 1000 hrs at 90 C. | % ILSS retention |
|---|---|---|---|---|
| Form #1 - 4% A1110 | 6 hrs@ 125 C. | 7075 | 5068 | 72 |
| Form #2 - 4% PC8-TOFA | 6 hrs@ 125 C. | 6,952 | 5207 | 72 |
| Form #3 - 4% NHEP-TOFA | 6 hrs@ 125 C. | 6,024 | 605 | 21 |
| Form# 4 - 4% Morpholine-2EHA | 6 hrs@ 125 C. | 7,260 | | |
| Form #5 4% NHEP:Acetic acid | 6 hrs@ 125 C. | | 597 | 23 |

While the invention has been described with reference to certain aspects or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:
1. An epoxy resin curing agent composition comprising at least one tertiary amine salt and at least one anhydride; wherein the tertiary amine salt comprises at least one member selected from the group of salts represented by the structure of Structure 1:

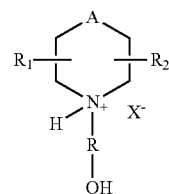

Structure 1 wherein A is $CH_2$, O, NH, or NR; R is an alkylene chain of 1-6 carbon atoms; $X^-$ is a carboxylate anion of 1-40 carbon atoms, and the group of salts represented by the structure of Structure 2:

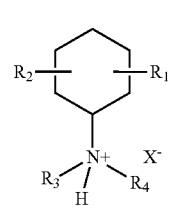

Structure 2 wherein $R_1$ and $R_2$ are H or alkyl and $R_3$ and $R_4$ are alkyl.

2. The composition of claim 1 wherein the tertiary amine salt is represented by the structure of Structure 1:

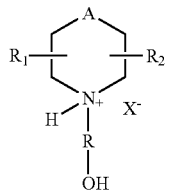

Structure 1 wherein A is $CH_2$, O, NH, or NR; R is an alkylene chain of 1-6 carbon atoms; $X^-$ is a carboxylate anion of 1-40 carbon atoms.

3. The composition of claim 2 wherein the tertiary amine salt comprises at least one member selected from the group consisting of N-hydroxyalkylpiperidinyl, N-hydroxyalkylmorpholinyl, N-hydroxypiperazinyl, 1-hydroxyethylpiperazinyl, and combinations thereof.

4. The composition of claim 1 wherein the tertiary amine salt is represented by the structure of Structure 2:

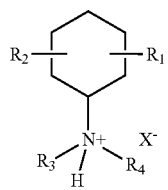

Structure 2 wherein $R_1$ and $R_2$ are H or alkyl and $R_3$ and $R_4$ are alkyl.

5. The composition of claim 4 wherein the tertiary salt comprises N-cyclohexyl-N,N-dimethylamine contacted with at least one acid selected from the group consisting of acetic acid, hexanoic acid and tall oil fatty acid.

6. The composition of claim 1 wherein the tertiary salt comprises the contact product of at least one carboxylic acid and at least one tertiary amine.

7. The composition of claim 6 wherein the tertiary amine comprises at least one member selected from the group consisting of N-hydroxyethylpiperidine, N-hydroxypropylpiperidine, 2-methyl-N-hydroxyethylpiperidine, N-hydroxymethylpiperidine, N-hydroxyethylmorpholine, 1,4-bis(2-hydroxyethyl)piperazine, 1,4-dimethylpiperazine, N-cyclohexyl-N,N-dimethylamine, N-cyclohexyl-N,N-diethylamine, N-cyclohexyl-N-ethyl-N-methylamine, N,N-dimethyl-N-(2-methylcyclohexyl)amine, N,N-dicyclohexyl-N-methylamine, N-hydroxyethyl-N-cyclohexyl-N-methylamine, N-cyclohexyl-N,N-dipropylamine, N-cyclohexyl-N,N-dioctylamine and combinations thereof.

8. The composition of claim 6 wherein the carboxylic acid comprises at least one member selected from the group consisting of acetic acid, propanoic acid, hexanoic acid, 2-ethylhexanoic acid, decanoic acid, tall oil fatty acid (TOFA), dimer acid and mixtures thereof.

9. The composition of claim 1 wherein the tertiary amine salt comprises N-hydroxyalkylpiperidinyl.

10. The composition of claim 6 wherein the tertiary amine comprises N-hydroxyethylpiperidine.

11. The composition of claim 10 wherein the carboxylic acid comprises tall oil fatty oil.

12. The composition of claim 6 wherein the tertiary amine comprises N-cyclohexyl-N,N-dimethylamine.

13. The composition of claim 11 wherein the carboxylic acid comprises tall oil fatty oil.

14. The composition of claim 1 wherein the anhydride comprises at least one member selected from the group consisting of polysebacic and polyazelaic anhydride; methyltetrahydrophthalic anhydride, tetrahydro phthalic anhydride, methyl nadic anhydride, hexahydro phthalicanhydride, and methylhexahydro phthalic anhydride; succinic anhydride, substituted succinic anhydride, citric acid anhydride, maleic anhydride, adducts of maleic anhydride, dodecyl succinic anhydride, maleic anhydride vinyl and styrene copolymers of maleic anhydride, multi-ring alicyclic anhydrides, phthalic anhydride, and trimellitic anhydride.

15. The composition of claim 1 further comprising at least one epoxy resin.

16. The composition of claim 15 further comprising fiberglass.

17. A heat curable composition comprising at least one tertiary amine salt, at least one anhydride, and at least one epoxy resin wherein the composition is curable at a temperature ranging from about 100 to about 150 C; and has an ΔH of about 150 to about 400 J/g and the cured composition has a Tg ranging from about 60 to about 175 as measured by differential scanning calorimetry; wherein the tertiary amine salt comprises at least one member selected from the group of salts represented by the structure of Structure 1:

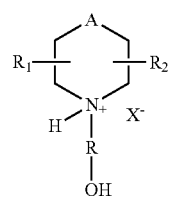

Structure 1 wherein A is $CH_2$, O, NH, or NR; R is an alkylene chain of 1-6 carbon atoms; $X^-$ is a carboxylate anion of 1-40 carbon atoms, and the group of salts represented by the structure of Structure 2:

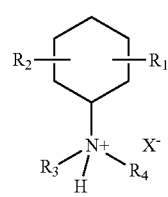

Structure 2 wherein $R_1$ and $R_2$ are H or alkyl and $R_3$ and $R_4$ are alkyl.

18. The composition of claim 17 further comprising fiberglass.

19. The composition of claim 17 wherein the composition comprises less than about 2 wt % tertiary amines.

20. The composition of claim 17 wherein the composition comprises less than about 2 wt % water.

21. The composition of claim 17 wherein the composition comprises about 0.8 to about 1.1 equivalents of anhydride.

22. The composition of claim 1 wherein the composition comprises about 1 to about 20 parts of tertiary amine salt.

23. A curing agent consisting essentially of at least one tertiary amine salt and at least one anhydride; wherein the curing agent has a ΔH of greater than 120 J/g and the tertiary amine salt comprises at least one member selected from the group of salts represented by the structure of Structure 1:

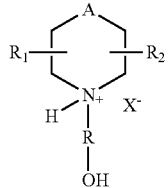

Structure 1 wherein A is $CH_2$, O, NH, or NR; R is an alkylene chain of 1-6 carbon atoms; $X^-$ is a carboxylate anion of 1-40 carbon atoms and the group of salts represented by the structure of Structure 2:

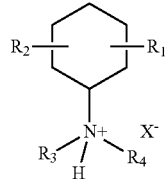

Structure 2 wherein $R_1$ and $R_2$ are H or alkyl and $R_3$ and $R_4$ are alkyl.

* * * * *